UNITED STATES PATENT OFFICE.

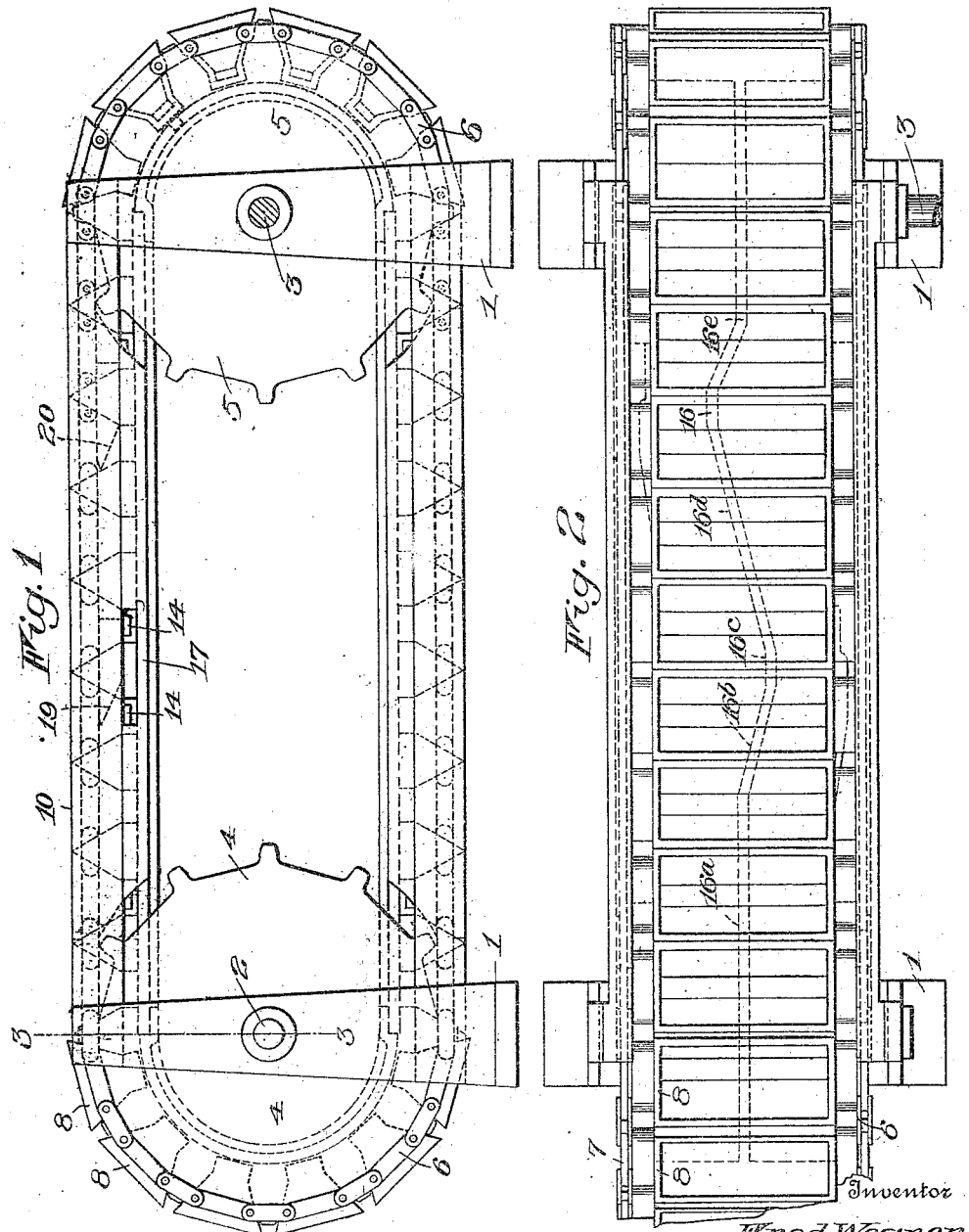

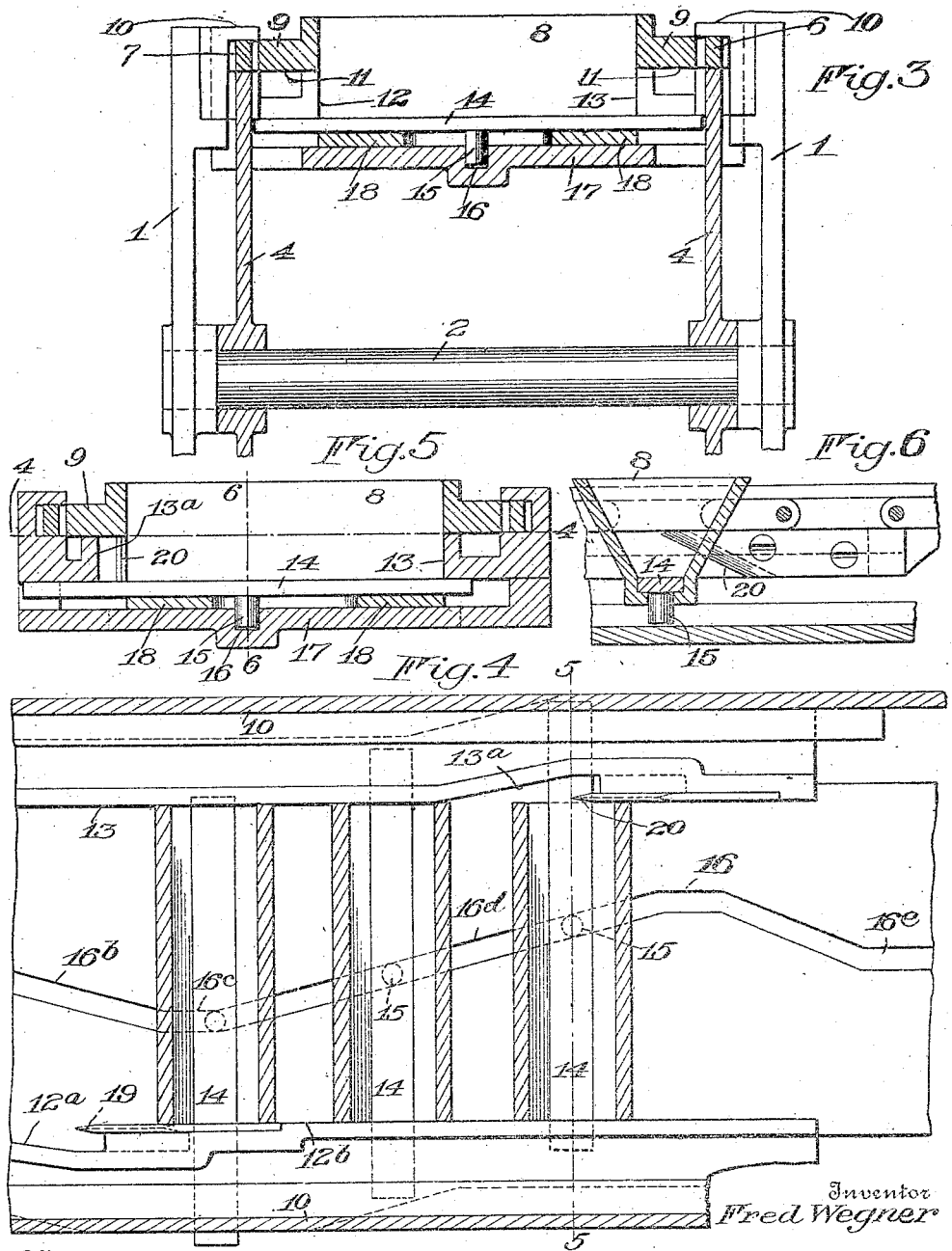

FRED WEGNER, OF FAIRPORT, NEW YORK, ASSIGNOR TO GEO. W. COBB, OF NEW YORK, N. Y.

BEAN-SNIPPER.

1,155,454. Specification of Letters Patent. Patented Oct. 5, 1915.

Application filed January 10, 1914. Serial No. 811,292.

*To all whom it may concern:*

Be it known that I, FRED WEGNER, of Fairport, in the county of Monroe and State of New York, have invented certain new and useful Improvements in Bean-Snippers; and I do hereby declare the following to be a full, clear, and exact description of the same, reference being had to the accompanying drawings, forming a part of this specification, and to the reference-numerals marked thereon.

This invention relates to mechanism for snipping the ends of string beans as required in preparing the same for market, and like operations.

A prime object of the invention is to provide an improved mechanism, simple and efficient in operation adapted to handle the beans rapidly, having them fed into receiving pockets in any convenient manner and carried forward in such pockets to snipping means successively operative on the two ends of the beans.

In accordance with my invention I provide a series of bean receiving holders on a conveyer having a horizontally extending stretch which presents the holders in receiving position. These holders are preferably of a shape to promote the straightening out and alining of the beans in parallelism and a part of each holder with which the beans engage, shown as the bottom thereof, is transversely slidable to one side at one portion of the conveyer travel and toward the other side at a subsequent portion, to move the beans transversely of the line of the conveyer movement into position to have their ends snipped by cutters positioned at the respective ends of the holders.

The above and other objects and features of the invention will be better understood from the following detailed description taken in connection with the accompanying drawings and will thereafter be pointed out in the appended claims.

Referring to the drawings: Figure 1 is a side elevation of a machine constructed in accordance with my invention; Fig. 2 is a plan view thereof; Fig. 3 is an enlarged vertical section on line 3—3 of Fig. 1; Fig. 4 is a horizontal section on line 4—4 of Fig. 5, taken intermediate of the holders on the upper stretch of the conveyer; Fig. 5 is a transverse section on line 5—5 of Fig. 4, and Fig. 6 is a detail vertical section on the line 6—6 of Fig. 5.

Similar reference numerals through the several figures indicate the same parts.

Upon a suitable framework 1, I provide journal bearings 2, 3, for spaced apart pairs of sprocket wheels 4—4 and 5—5, these sprocket wheels being preferably of similar size and in horizontal alinement. Upon these sprocket wheels I mount conveyer chains 6, 7, supporting between them a series of bean holders 8, said holders being secured to the chain links in any suitable manner. These holders are, as shown, of an oblong troughlike form with upwardly and outwardly sloping sides, and they are preferably so spaced on the chains that on the horizontal stretch thereof the holder sides are in close juxtaposition as seen in Fig. 2. These sloping holder tops are of a length corresponding to that of the beans handled which is somewhat less than the distance between the sprocket chains and the holders are equipped with laterally projecting ears 9 having engagement with the sprocket chains which are guided in overhanging brackets 10 at each side of the framework. The lower portions of the holders 8 have their ends cut out as seen at 11 and the end openings thus formed are closed along the receiving portion of the conveyer on the top stretch thereof by rails 12, 13 carried by the framework in position to act for this purpose, and formed to constitute a continuation of the vertical holder ends. The bottoms of the holders are formed by transversely slidable plates 14 having depending pins 15 engageable in an irregular groove 16 formed in the top of a backing plate 17 carried by the frame. The sliding plates 14 rest on the backing plate 17 with interposed filling pieces 18 and they are of a length so that when reciprocated by the action of the pins 15 entering the irregular groove 16 as presently described they still cover the entire holder bottom throughout the range of reciprocation.

The beans are deposited in the holders toward the left hand side of the device as seen in Figs. 1 and 2, and they are moved endwise first in one direction and then in the other to have their ends snipped, by the action of the movable bottom plates 14 which are reciprocated by irregular groove 16. For this purpose the groove 16 has an initial central straight portion 16ª adapted to hold the bottom plates 14 stationary in the bean receiving position; this grooved portion merges into an oblique portion 16ᵇ adapted to move the bottom plates toward the observer in Fig. 1 or downward in Fig. 2. Corresponding in position to this oblique groove portion the guard rail 12 at one side of the holder bottoms has an offset inclined portion 12ª making room and clearance for a shear cutter 19 adapted to coöperate with the ends of the holder sides for snipping off one end of the beans, this cutter being suitably fixed to a side of a continuation 12ᵇ of the rail 12. The oblique groove portion 16ᵇ with a short interposed portion 16ᶜ parallel with the line of movement merges into another oblique portion 16ᵈ which acts on the pins 15 to move the bottom plates 14 from their extreme position at one side, past the center to an extreme position at the other side of the mechanism. In line with the extremity of this oblique portion, the guide rail 13 is offset as at 13ª to provide room and clearance for a shear cutter 20 similar to the cutter 19 and coöperative with the other ends of the holders to shear off the remaining ends of the beans. In their further progress the bottom plates are returned to intermediate position by a central portion 16ᵉ of the guide groove and as the holders pass around the sprocket wheels 5 the snipped beans are discharged. The sprocket chains with the bean holders carried thereby preferably fit the guide brackets 10 quite accurately and as the holders have a guide support on the backing 17 underneath throughout the range of operative movement, it will be understood that the shear cutters 19 and 20 will act effectively and with certainty on the beans, since the ends of the holder are held closely guided in operative relation thereto.

There is, of course, no particular significance in having the bean receiving stretch of the conveyer quite or even nearly horizontal, the only desideratum in this respect being that this portion of the conveyer have an extension in a horizontal direction either with or without a vertical direction component, such as to present the bean holders in convenient bean receiving position, and where I use the expression "horizontally extending" and the like in the claims it is to be taken with this broader interpretation.

While the present arrangement with the holder bottoms transversely movable as described is a practicable and efficient one, I desire this form to be considered as illustrative and as typifying any construction wherein a movable part is actuated by operative movement of the holders for transversely alining the beans into position for snipping of their two ends successively.

Since the above and other features of the invention can be modified from the form shown, without departing from the spirit of the invention I refer to the appended claims rather than to the foregoing description to indicate the scope of the invention.

I claim as my invention:

1. A bean snipping apparatus comprising a conveyer bearing bean holders, cutters at each side of said conveyer at separated points along the line of its travel, and means operable by the conveyer movement for shifting beans in said holders independently thereof endwise first into operative relation to one of said cutters and then to the other for snipping the ends thereof.

2. A bean snipping apparatus comprising a conveyer bearing bean holders, each of said holders having a bean engaging portion therein movable transversely of the line of conveyer movement, cutters mounted at each side of said conveyer at separated points along the line of its travel and means for moving said movable holder portions for presenting first one end of the beans to one of said cutters and thereafter the remaining end to the other cutter.

3. Apparatus of the kind described, comprising a conveyer bearing bean holders extending transversely of the line of the conveyer movement, said holders having transversely movable lower portions adapted to engage the beans, means for moving said conveyer portions first toward one side of the conveyer from a median line and then toward the other, and cutting means mounted in position to snip first one end of the beans and then the other as they are moved lengthwise in said holders.

4. Apparatus of the kind described, comprising an endless conveyer having a horizontally extending stretch, transversely extending bean holders carried by said conveyer, said holders having lower portions movable transversely of the direction of the conveyer movement, said portions having provision for movement toward one side of the conveyer at one part of its travel and toward the other side at another part, and cutters mounted in position to snip the bean ends successively as they are moved in said holders.

5. Apparatus of the kind described, comprising an endless conveyer having a horizontally extending stretch, bean holders carried by said conveyer extending transversely of its line of movement and of open trough-like form, said holders having transversely movable bottoms, a fixed element having an irregular groove engaging a portion of said movable bottoms to move them transversely first toward one side and then toward the other of the conveyer as it progresses, and shear cutters mounted for coöperation with the two ends of the bean holders in position to snip the respective ends of the beans, as they are moved endwise in said holders by engagement with said movable bottom portions of the holders.

FRED WEGNER.

Witnesses:
ANNA P. WEGNER,
WALTER F. WEGNER.